US008150990B2

(12) United States Patent
Ogram

(10) Patent No.: US 8,150,990 B2
(45) Date of Patent: Apr. 3, 2012

(54) ENHANCED ADVERTISING USING DUAL STREAMING VIDEO

(76) Inventor: Mark Ellery Ogram, Tucson, AZ (US)

( * ) Notice: Subject to any disclaimer, the term of this patent is extended or adjusted under 35 U.S.C. 154(b) by 0 days.

(21) Appl. No.: 11/708,761

(22) Filed: Feb. 20, 2007

(65) Prior Publication Data

US 2007/0180138 A1 Aug. 2, 2007

Related U.S. Application Data

(63) Continuation of application No. 09/818,262, filed on Mar. 26, 2001, now abandoned.

(51) Int. Cl.
*G06F 15/16* (2006.01)
(52) U.S. Cl. ........................................ 709/231
(58) Field of Classification Search .................. 709/231, 709/219, 236; 725/131–139
See application file for complete search history.

(56) References Cited

U.S. PATENT DOCUMENTS

| | | | | |
|---|---|---|---|---|
| 5,949,476 A * | 9/1999 | Pocock et al. | ................. | 348/24 |
| 5,983,005 A * | 11/1999 | Monteiro et al. | ............. | 709/231 |
| 6,006,241 A * | 12/1999 | Purnaveja et al. | ............ | 715/205 |
| 6,035,341 A * | 3/2000 | Nunally et al. | ............... | 709/253 |
| 6,381,746 B1 * | 4/2002 | Urry | .......................... | 725/87 |
| 6,446,130 B1 * | 9/2002 | Grapes | .......................... | 709/231 |
| 6,539,545 B1 * | 3/2003 | Dureau et al. | .................. | 725/48 |
| 6,931,660 B1 * | 8/2005 | Kalluri et al. | ................. | 725/131 |
| 7,231,650 B1 * | 6/2007 | Pinera et al. | ..................... | 725/1 |
| 7,286,502 B1 * | 10/2007 | Rao et al. | ...................... | 370/328 |
| 2002/0056121 A1 * | 5/2002 | Ledbetter | ....................... | 725/87 |
| 2002/0056123 A1 * | 5/2002 | Liwerant et al. | ................ | 725/87 |
| 2002/0087402 A1 * | 7/2002 | Zustak et al. | .................. | 705/14 |
| 2002/0105967 A1 * | 8/2002 | Chen | ............................ | 370/465 |

FOREIGN PATENT DOCUMENTS

EP 1162806 A2 * 12/2001

* cited by examiner

*Primary Examiner* — Minh-Chau Nguyen

(57) ABSTRACT

A communications system particularly suited for a distributed network of computers such as the World Wide Web or the Internet. Connected to the distributed network is a broadcast computer which simultaneously communicates two streams of video. The first stream of video contains entertainment; the second stream of video contains commercial content. The receiver of the two streams has both streams displayed simultaneously and is able to select which stream's audio component is communicated to the user's computer's loudspeakers. In one embodiment of the invention, the user is also able to replace the commercial channel with another commercial channel.

12 Claims, 6 Drawing Sheets

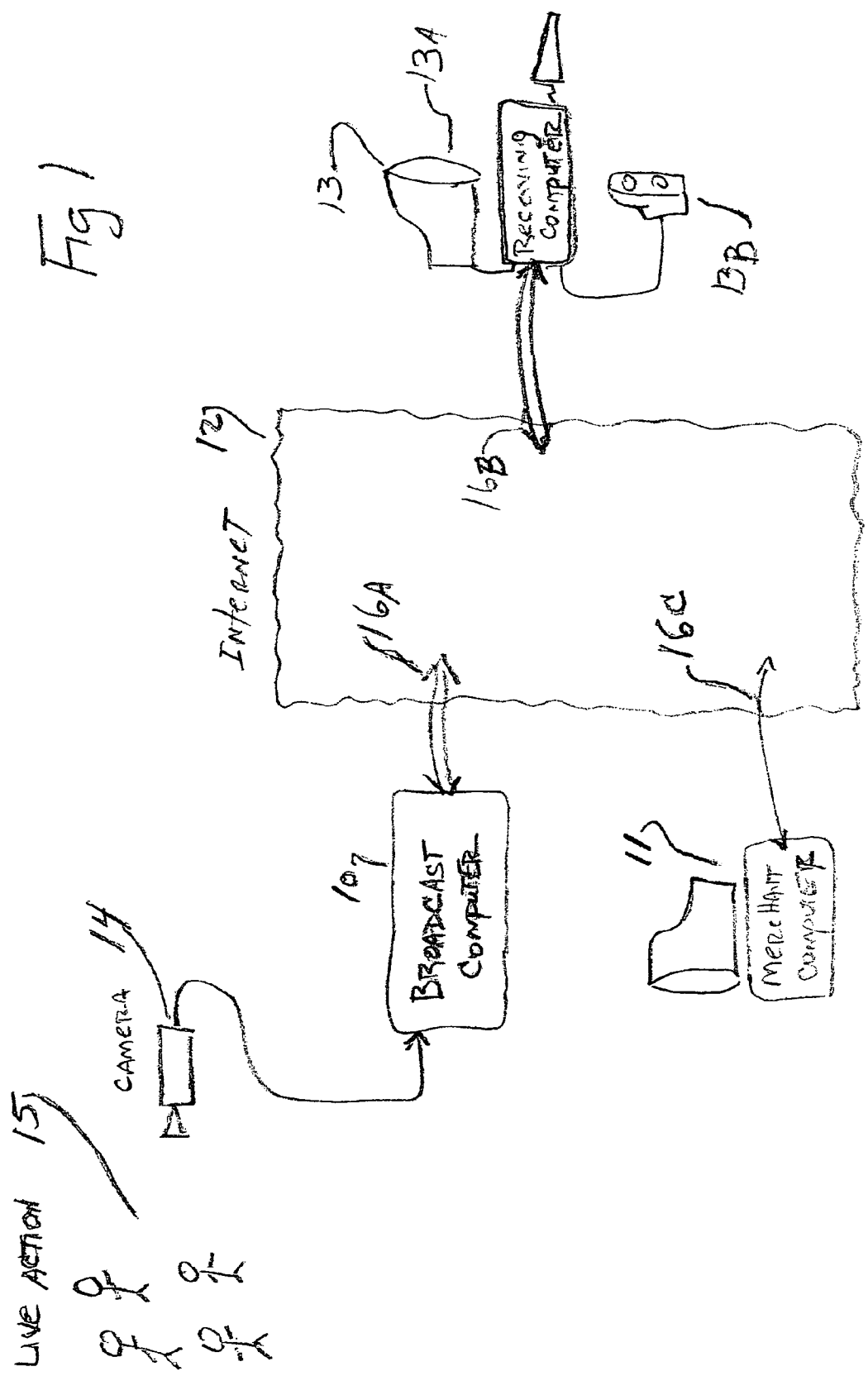

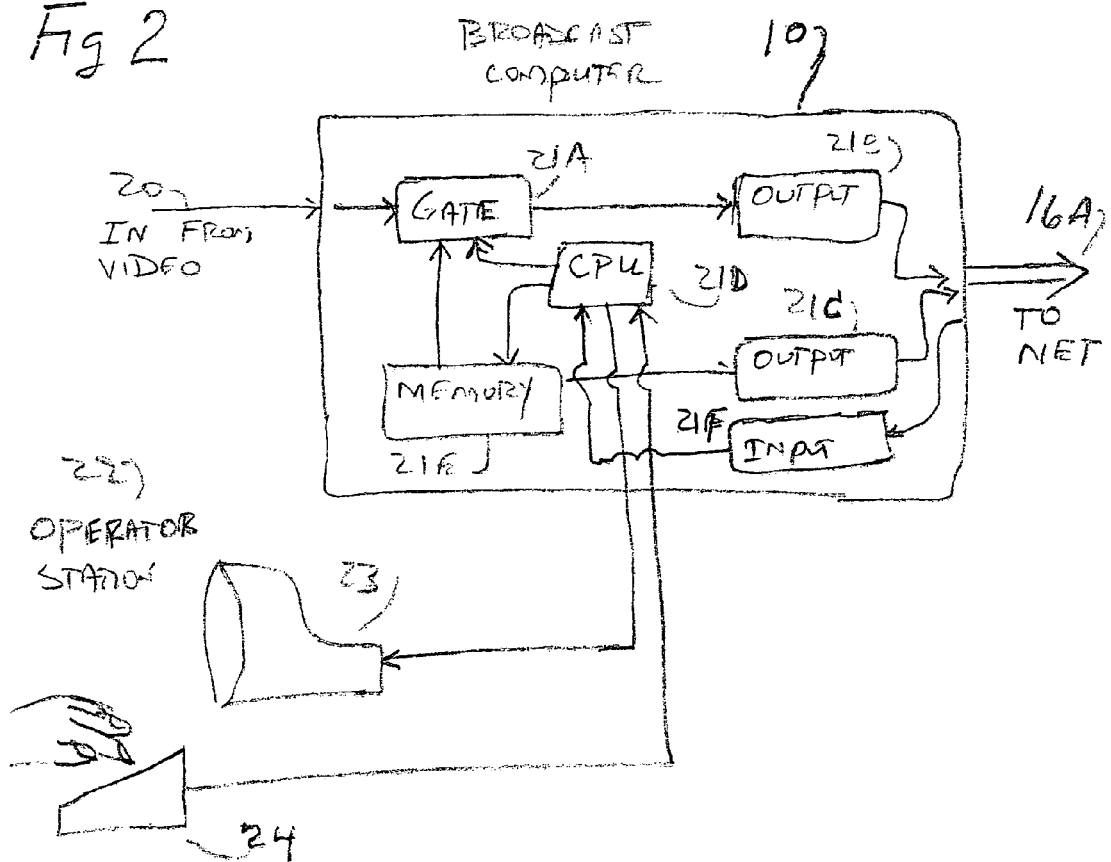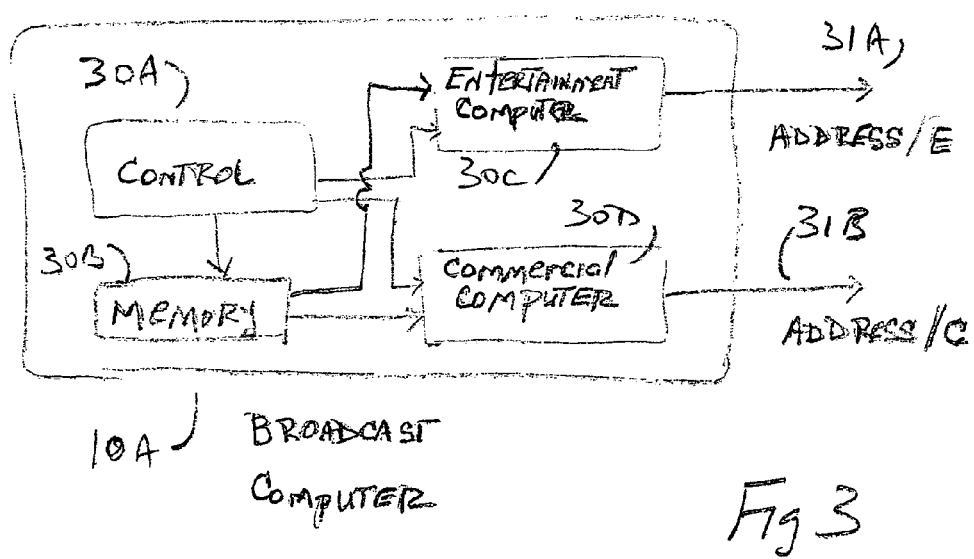

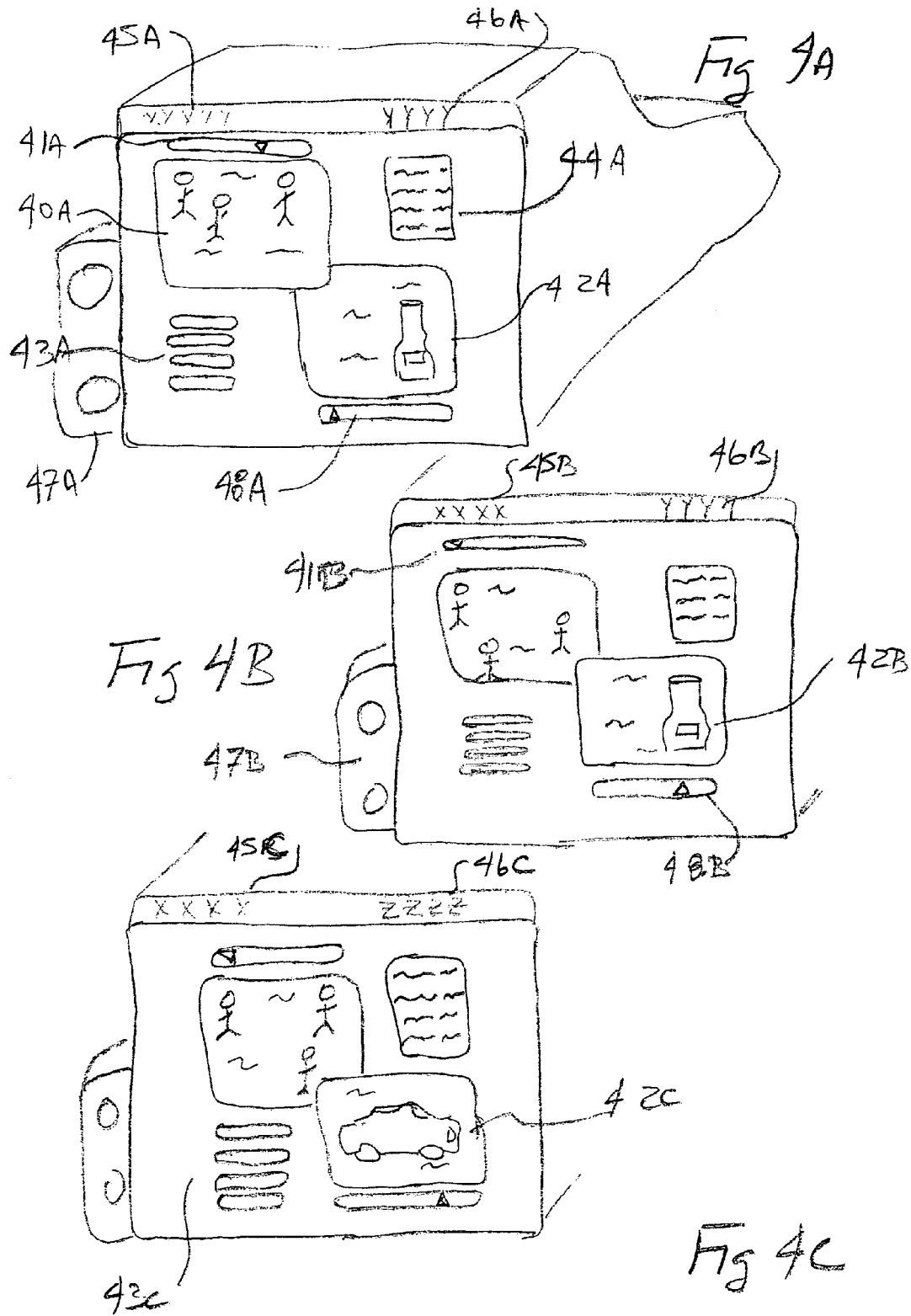

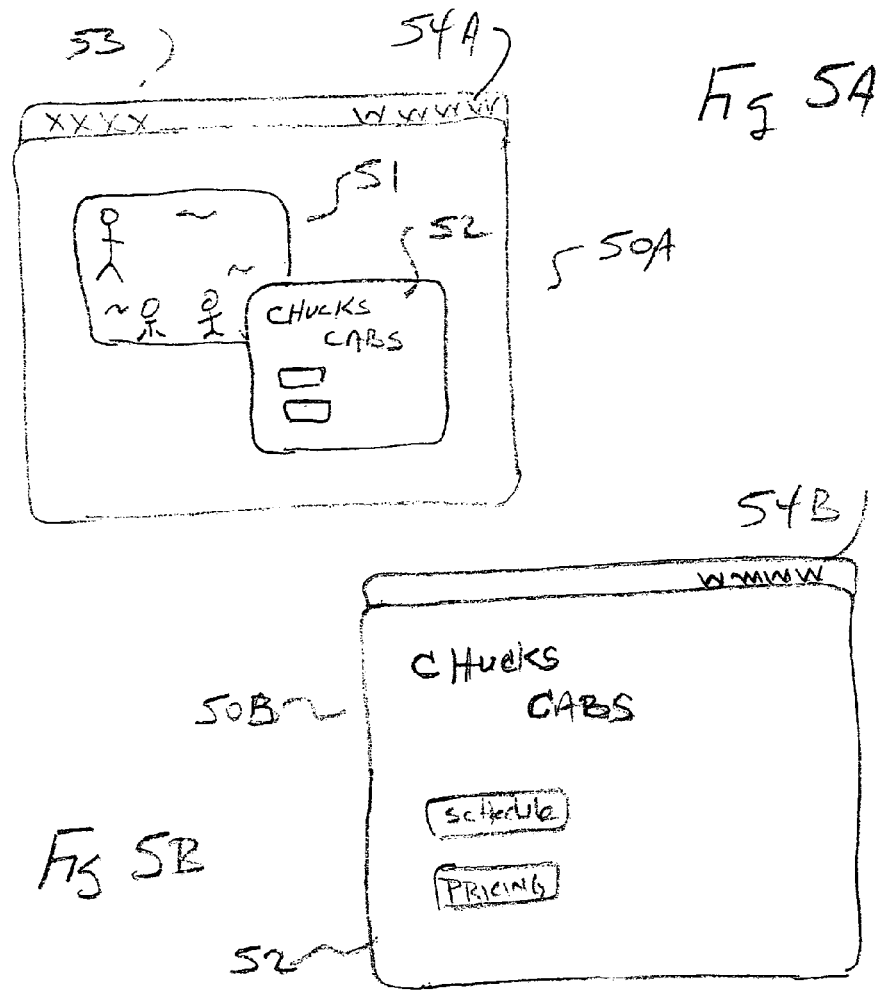
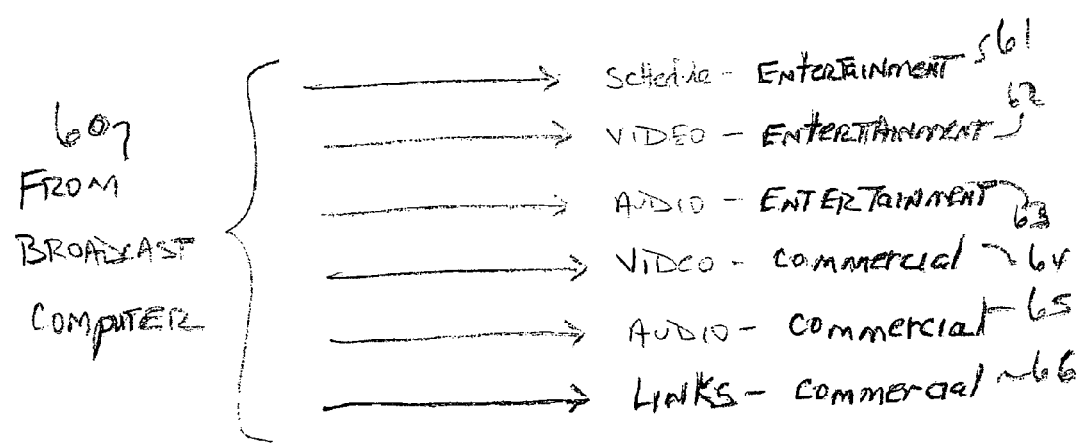

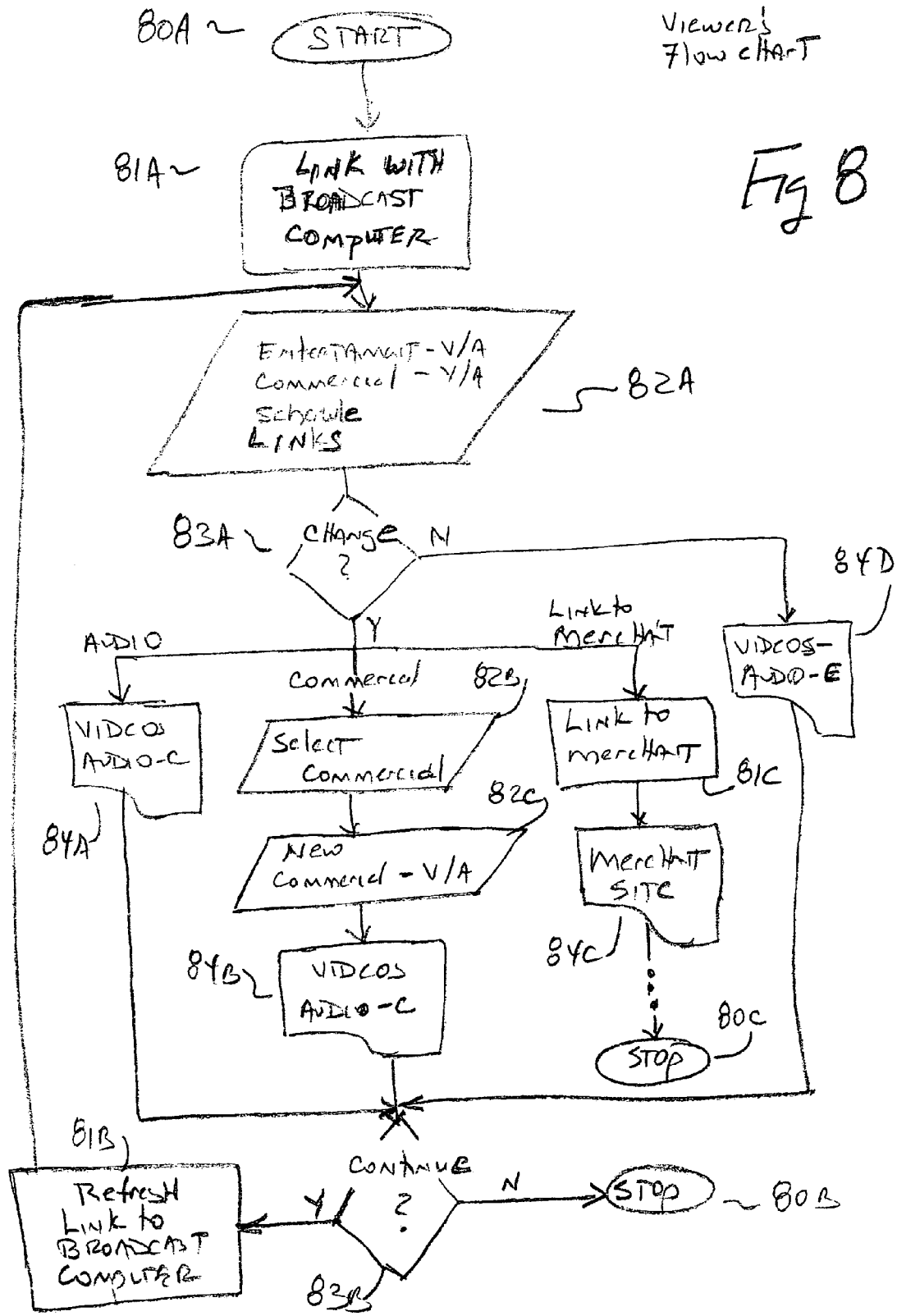

ENHANCED ADVERTISING USING DUAL STREAMING VIDEO

BACKGROUND OF THE INVENTION

This is a continuation of U.S. patent application Ser. No. 09/818,262, filed on Mar. 26, 20001 now abandoned and entitled, "Apparatus and Method for Communicating over a Distributed System of Computers".

This invention relates generally to apparatus used to communicate and more particularly to communication through a network of computers.

The present discussion is in relationship to the Internet or the World Wide Web. This is done for simplicity of description and not to limit the scope of the invention. The invention is intended to cover any distributed network of computers as those of ordinary skill in the art readily appreciate.

With the introduction and subsequent wide spread acceptance and use of the Internet, a medium for communication now exists in which millions of users have instant access to a wide range of information. While some of this information is static (i.e. news articles and product explanations), there are also a level of information that falls into the "motion" category (i.e. movies and live-cams).

The motion category of information is usually communicated for its entertainment, as opposed to educational, purpose; but even this distinction is blurred by the broadcaster's ingenious use of the medium.

To assist in communicating this content, a variety of patents have been developed to create a moving picture communicated through the Internet (sometimes referred to as "streaming video"). These include: U.S. Pat. No. 6,029,200, entitled "Automatic Protocol Rollover in Streaming Multi-Media Data Delivery System" issued to Beckerman et al. on Feb. 22, 2000; U.S. Pat. No. 5,983,005, entitled "Multicasting Method and Apparatus" issued to Monteiro et al. on Nov. 9, 1999; U.S. Pat. No. 5,778,187, entitled "Multicasting Method and Apparatus" issued to Monteriro et al. on Jul. 7, 1998; U.S. Pat. No. 6,088,737, entitled "Information Processing System and Control Method Thereof" issued to Yano et al. on Jul. 11, 2000; U.S. Pat. No. 6,079,566, entitled "System and Method for Processing Object-Based Audiovisual Information" issued to Eleftheriadis et al. on Jun. 27, 2000; U.S. Pat. No. 6,072,483, entitled "Active Frame Scroll Interface" issued to Rosin et al. on Jun. 6, 2000; U.S. Pat. No. 6,044,397, entitled "System and Method for Generation and Interfacing of Bit-streams Representing MPEG-Coded Audiovisual Objects" issued to Eleftheriadis et al. on Mar. 28, 2000; U.S. Pat. No. 6,009,410, entitled "Method and System for Presenting Customized Advertising to a User on the World Wide Web" issued to LeMole et al. on Dec. 28, 1999; and U.S. Pat. No. 6,006, 241, entitled "Production of a Video Stream with Synchronized Annotations over a Computer Network" issued to Purnaveja et al. on Dec. 21, 1999; all of which are incorporated hereinto by reference.

It is clear from the foregoing that there is a significant need for video distribution over the Internet and other distributed networks of computers.

SUMMARY OF THE INVENTION

The invention is a communications system particularly suited for a distributed network of computers such as the World Wide Web or the Internet. While the nomenclature or title changes, a distributed network of computers is a system of computers which share information (whether the information is stored within a computer or is generated by operators of the computers). This sharing of information is accomplished through a variety of mechanisms well known to those of ordinary skill in the art and can be either "hard wired", "wireless", a combination thereof, or other such system.

Connected to the distributed network is a broadcast computer. Within this context, a "computer" is an electronic apparatus which executes a series of commands. In one embodiment of the invention, a "gang" or grouping of computers is utilized to serve the function of the "broadcast computer". A grouping of computers is intended to be included within this definition.

The broadcast computer simultaneously communicates two streams of video. Suitable techniques for this task are explained in detail in the patents referenced above. Those of ordinary skill in the art readily recognize a variety of other methodologies which will serve this function.

The first stream of video contains entertainment. This video stream is created through a variety of techniques. In one embodiment of the invention, a pre-recorded video is stored within the library or memory of the broadcast computer and is then "downloaded" upon request.

In yet another embodiment of the invention, the video stream is "live". In this embodiment, a camera or cameras are established to capture a scene as it happens. The electronic stream from the camera is communicated to the broadcast computer "live" to give the viewer an immersion into the activity. This embodiment of the invention is particularly suited for use within a theme park. The viewer is then able to view the activities at a remote theme park and enjoy the activities and costumed characters.

The second stream of video contains commercial content. While the distinction between "commercial" and "entertainment" is often blurred, this second stream of video's predominate purpose is acquaint the viewer with product(s) or service (s) with the intent that, once so informed, the viewer is enticed to purchase the product(s) or service(s).

As example, using the live theme park for reference, the first video stream might contain live action from the main street within the theme park while the second video might contain information on the local hotels.

At the other end of the network of computers is a computer which serves as the receiver. The receiving computer simultaneously displays the two streams of video. The user of the receiving computer is able to view both action scenes simultaneously and is able to select which stream's audio component broadcast via the receiving computer's loudspeakers.

Using the prior example of the theme park, the view is able to see both the video on the main street and also the video commercial on the hotels. For a while the viewer "listens" to the main street (say as the band passes by) and later changes to hear the video on the hotel being described. In this way, the viewer is given an idea of the theme park's entertainment, and is also able to consider lodging options near the theme park.

In one embodiment of the invention, a display is produced to track the commercial video's content. This display is usually a scrolling apparatus allowing the user to "backtrack" to a specific spot on the video. As example, if the video has progressed past the Hilton Hotel and the Days Rest and is now displaying the commercial description of the Slumber Inn, the user is able to "click" (select) Days Rest and have the commercial video retrace itself to this location for a second display for the viewers review.

In a further embodiment of the invention, the "click" on Days Rest initiates a link (via the distributed network of computers) with the reservations computer for Days Rest; thereby allowing the user to make reservations while still on-line.

In this embodiment of the invention, the linking of the receiving computer with the Days Rest computer may sever the link with the broadcast computer; or the Days Rest computer communicates messages which simply replace the area of the receiving computer's screen that was displaying the second video.

In one embodiment of the invention, the user is also able to replace the commercial channel with another commercial channel. This capability provides the user with a fresh advertisement video; thereby allowing the user to purview other products or services.

Using the prior example of the theme park, the second video stream on hotels in the area may be replaced with a video giving details on flight schedules, car rentals, novelty products from the theme park, etc.

The invention, together with various embodiments thereof, will be more fully explained by the accompanying drawings and the following description thereof.

DRAWINGS IN BRIEF

FIG. 1 is a functional layout of the preferred embodiment of the invention.

FIG. 2 is a functional layout of the preferred broadcast computer.

FIG. 3 is a functional layout of an alternative embodiment of the broadcast computer.

Figure 7:
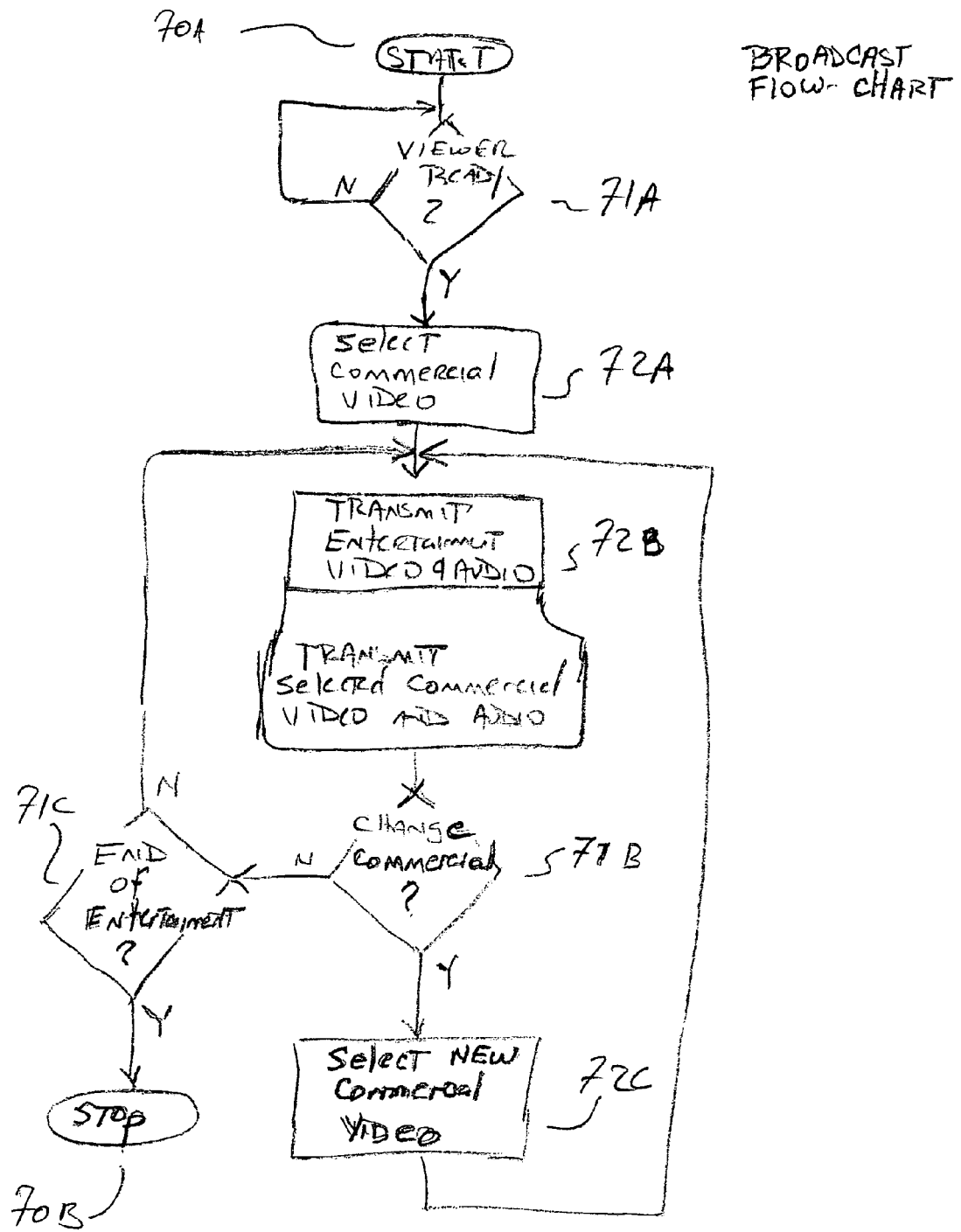

FIGS. 4A, 4B, and 4C are views of user/receiver displays for the preferred embodiment of the invention.

FIGS. 5A and 5B are views of the user/receiver displays showing alternative embodiments for communicating a merchant's site to the user/receiver.

FIG. 6 illustrates the informational context communicated from the broadcast computer to the network of computers.

FIG. 7 is a flow-chart of the operation of the broadcast computer in the preferred embodiment.

FIG. 8 is a flow-chart of the operation of the receiving computer in the preferred embodiment.

DRAWINGS IN DETAIL

FIG. 1 is a functional layout of the preferred embodiment of the invention.

Within this illustration, the distributed network of computers is illustrated as the Internet Using this network is the broadcast computer 10, the receiving computer 13, and the merchant computer 11, as well as many others not shown.

Information is exchanged between the broadcast computer 10 and the receiving computer using channels 16A and 16B. Channel 16A permits the two video streams, their associated audio, and other data streams to be communicated through Internet 12 to exit as channel 16B and used by the receiving computer 13. This information, is communicated to a user using display 13 and speakers 13B.

In like fashion, information generated by the user of receiving computer 13 is communicated via channel 16B through the Internet 12 and channel 16A to the broadcast computer 10. This return exchange of information permits the user to request certain information from the broadcast computer, such as, but not limited to, changing the commercial video being sent by broadcast computer 10.

In this illustration, the entertainment video stream is originally generated by camera 14 which captures a live action 15. The output of camera 14 is communicated to the broadcast computer 10 which sends out the video stream substantially upon receipt, to receiving computer 13. This embodiment is particularly useful for the scenario described above where the live action 15 is collected from a theme park.

The user of receiving computer 13 is able to "link" with merchant computer 11 and obtain information concerning the products provided by the merchant and which have been advertised using the commercial channel originating from the broadcast computer.

The information from the merchant computer is communicated to the Internet 12 via channel 16C and is obtained by the receiving computer using channel 16B.

In this discussion, channels 16A, 16B, and 16C, may or may not be physical links such as telephone lines, or the like. These channels are used to show the passage of information from the Internet 12 to and from the various computers connected to the Internet 12.

Note, in this illustration, although the commercial content of the video is being disseminated by broadcast computer 10, the user is able to directly contact the merchant's computer 11 (which is remote from broadcast computer 10) to obtain further information on the products, clarify points of interest on the products advertised, or to place orders for specific goods from the merchant.

FIG. 2 is a functional layout of the preferred broadcast computer.

In this preferred embodiment of broadcast computer 10, the incoming video 20 is communicated through gate 21A. The entire operation of broadcast computer 10 is controlled by Central Processing Unit (CPU) 21D. CPU 21D, through control of gate 21A allows the video stream to flow to output mechanism 21B and then into channel 16A which places the video into the Internet (not shown in this illustration).

CPU 21D also draws information from memory 21E which is combined with the video through gate 21A. This information is usually textual in context. In the preferred embodiment, the textual information withdrawn from memory 21E is a schedule of what events are forthcoming within the video stream 20. As example, the textual information for the theme park example may read:

| Event | Time to Event |
|---|---|
| Main Street Parade | 15 minutes |
| Interview with Guest | 25 minutes |
| Band Time News | 32 minutes |

This textual information is updated as time progresses.

Memory 21E, in this embodiment, is used to store the commercial videos. As directed by CPU 21D, memory 21E communicates a commercial video via output 21C to join in channel 16A with the entertainment video.

Selection of the proper commercial video within memory 21E is accomplished either automatically, or in response to a remote user's input received via channel 16A and communicated to input 21F for use by CPU 21D.

Further control of CPU 21D is accomplished by operator station 22 which uses montiro 23 and keyboard 24 for two-way information exchange with CPU 21D.

FIG. 3 is a functional layout of an alternative embodiment of the broadcast computer.

Broadcast computer 10A is centrally controlled using control 30A. Stored with control 30A are directions (either using software or hardwired) to withdraw from memory 30B, both the entertainment video as well as the commercial video. In this embodiment, the entertainment video is typically pre-recorded and then is communicated when the user requests it. An example of such a pre-recorded video is a movie or documentary.

The entertainment video is communicated from memory 30B to the entertainment computer 30C which formats the video stream and communicates it to the remote receiver using a first source address 31A (denoted in this illustration as "address/E". In like fashion, the commercial video is communicated from memory 30B to the commercial computer 30D which then formats the commercial video and communicates it using a second source address 31B (denoted "address/C").

This embodiment of the invention is particularly powerful as it permits the receiver to view two different sites (video sites in this illustration) at the same time.

To use the prior example of a theme park, in one embodiment of the invention, when the core address for the theme park is: http://www.themepark.com, then the address for the entertainment video and commercial video would be:

| | |
|---|---|
| entertainment video- | http://www.themepark.com/entertainment |
| commercial video- | http://www.themepark.com/commercial/hotels |

Other commercial videos would use other address for communicating their particular genre of commercials:

| | |
|---|---|
| http:www.themepark.com/commercial/rentalcars | (for rental cars) |
| http:www.themepark.com/commercial/eating | (for restaurants) |
| http:www.themepark.com/commercial/curios | (for items from the park) |

It is clear that using this technique, any number of commercial videos can be stored and then retrieved to be sent out as per the request of the receiving computer.

FIGS. 4A, 4B, and 4C are views of user/receiver displays for the preferred embodiment of the invention.

Referring to FIG. 4A, the two video streams are displayed as entertainment 40A and commercial 42A. The audio component of the video for the entertainment 40A is chosen by audio bar 41A allowing the entertainment audio to be communicated to speaker 47A. When audio bar 41A is activated, audio bar 48A is muted, thereby allowing only a single audio component to be played at any one time.

Commercial video 42A continues to play, associated with commercial video 42A is an historical linking 43A which provides the means for the user to "backtrack" to past advertisements or to select other commercial subject matters. This allows the user to "notice" an advertisement and not have to rush to "click" and gain further information before the advertisement disappears from the commercial video 42A.

Pre-view chart 44A is tied to entertainment video 40A and provides a listing of what events are forthcoming on entertainment video 40A. This allows the user to anticipate the upcoming events.

For this embodiment of the invention, the "browser" or software used by the receiving computer is designed to capture video from two different addresses, 45A and 46A. These addresses define the source of the entertainment video 40A (address 45A) and the commercial video 42A (address 46A).

FIG. 4B illustrates the situation where the user has activated the audio component from the commercial video 42B using audio bar 48B. This automatically mutes audio bar 41B so that only the audio for the commercial video 42B is played by speakers 47B.

Note, the receiving computer is still linked to the same addresses 45B and 46B as that shown in FIG. 4A. Switching these addresses, as shown in FIG. 4C results in a different commercial video 42C being shown.

While the entertainment address 45C remains the same, the user has connected to a new commercial address 46C. This accomplished, in the preferred embodiment, by clicking on linking 43C which results in a new commercial video 42C being shown.

In the manner outlined in FIGS. 4A, 4B, and 4C, the user of the receiving computer is able to select which commercial video is shown, and the audio used while both an entertainment and an audio video are simultaneously displayed.

FIGS. 5A and 5B are views of the user/receiver displays showing alternative embodiments for communicating a merchant's site to the user/receiver.

FIG. 5A illustrates the preferred embodiment of the invention in which the receiver has chosen to be linked with the merchant computer. Displayed on the receiving monitor 50A is the entertainment video 51 corresponding to address 53, as well as the merchant's display 52 corresponding to address 54A.

Note, the source of entertainment video 51 is from the broadcast computer; the source of the merchant display 52 is from a different computer, often owned and operated by the merchant.

An alternative embodiment is shown in FIG. 5B. In this embodiment, when the receiver wants to view the merchant's display 52, it totally captures display 50B and the receiving computer is linked only with address 54B.

FIG. 6 illustrates the informational context communicated from the broadcast computer to the network of computers.

Within the preferred embodiment, the informational content 60 being sent by the broadcast computer falls into six main categories:

1.—Textual material related to the entertainment portion 61;
2.—Entertainment video stream 62;
3.—Audio associated with the entertainment video stream 63;
4.—Commercial video stream 64;
5.—Audio associated with the commercial video stream 65; and,
6.—Textual material relating to historical accounting of the commercials (often being links to merchants), as well as selections for alternative commercial videos.

Those of ordinary skill in the art recognize a variety of other types of information that may be included with this grouping.

FIG. 7 is a flow-chart of the operation of the broadcast computer in the preferred embodiment.

Once start 70A occurs, the program determines if the viewer is ready 71A. When the viewer is ready, the program selects a commercial video 72A and then transmits the entertainment video and audio, simultaneously, the selected commercial video and audio is transmitted 72B A check is then made to determine if the user wants to change the commercial 71B, in which case the new commercial video is withdrawn 72C and then transmitted 72B.

If the user does not want to change the commercial video 71B, then a determination is made on if the entertainment video has been completely run 71C. If so, the program stops 70B; otherwise, the next segment of the entertainment video and audio (together with the selected commercial video and audio) is sent 72B.

FIG. 8 is a flow-chart of the operation of the receiving computer in the preferred embodiment.

When the receiving computer starts 80A, it links with the broadcast computer 81A, and obtains the downloaded data 82A. This downloaded data is the entertainment video and audio, the commercial video and audio, the schedule, and the links.

If the user of the receiving computer doesn't want to change 83A, the downloaded material is displayed 84D. A determination is made to continue 83B, and if the program is to continue, the link with the broadcast computer is refreshed 81B and a new set of download data 82A is collected; if the program is not to continue, it stops 80B.

Returning to the options available to the user of the computer 83A, the user's choices also include the ability to change the audio feed to the commercial video 84A (followed by the continue option 83B and its subsequent operations described above).

Another option available to the user is to selected a different commercial video 82B, after which the data on the new commercial video and its associated audio is downloaded 82C; whereupon the videos are displayed using the audio from the new commercial video 84B. Again, the choices on continue 83B are then executed.

Yet another option allows the user to link with the merchant computer 81C. The merchant site is then displayed 84C. Once the merchant site has been utilized by the user, the program stops 80C.

It is clear that the present invention provides for a highly improved communication mechanism and method suited ideally for a distributed network of computers.

What is claimed is:

1. A broadcasting system connected to a distributed network for computers, and programmed to transmit independently a first stream of video and a second stream of video to a remote computer via said distributed network for computers to at least two remote computers for simultaneous display thereon together with an selected audio from either the first stream of video or the second stream of video.

2. The broadcasting system according to claim 1, wherein said broadcast computer is programmed to select said second stream of video from a library.

3. The broadcasting system according to claim 2, wherein said first stream of video is supplied to said broadcast computer via a real-time camera.

4. The broadcasting system according to claim 3, wherein said first stream of video is transmitted substantially upon receipt of said first stream of video from said camera by said broadcast computer.

5. The broadcasting system according to claim 1, wherein said broadcast computer is programmed to communicate an audio component with said first stream of video and an audio component with said second stream of video.

6. The broadcasting system according to claim 1, wherein said broadcast computer further includes:
   a) a third stream of video, said third stream of video containing commercial content; and,
   b) is programmed to, responsive to an indicia from the remote computer, to transmit independently said third stream of video in lieu of the second stream of video with the first stream of video.

7. A communications system comprising:
   a) a distributed network for computers;
   b) a broadcast computer connected to said distributed network for computers, said broadcast computer having access to a first stream of video containing entertainment content, said first stream of video including an audio component, said broadcast computer programmed to automatically:
      (1) select a second stream of video based upon said first steam of video, said second stream of video including an audio component, and,
      (2) transmit independently the first stream of video and the second stream of video to a remote computer via said distributed network for computers; and,
   c) at least two remote computers each having audio speakers and receiving said first stream of video and said second stream of video, wherein the first stream of video is received independently of the second stream of video, each of said at least two remote computers displaying, simultaneously, both streams of video and a selected one of said audio component from one of said stream of video.

8. The communications system according to claim 7,
   a) wherein said second stream of video includes address identifiers therein; and
   b) wherein said address identifiers are periodically communicated to said remote computer.

9. The communications system according to claim 8, wherein said remote computer is programmed to:
   a) transmit a historical listing of said address identifiers to a user of said remote computer; and,
   b) responsive to an operator selection of a selected address identifier, connect said remote computer to a merchant computer remote from said broadcast computer.

10. A method of communicating entertainment content comprising the steps of:
    a) arranging a first stream of entertainment video and a second stream of video, said second stream of video being substantially of commercial content;
    b) transmit independently the first stream of entertainment video and the second stream of video to a remote computer via a distributed network of computers to a group of remote computers; and,
    c) simultaneously displaying said entertainment video and said second stream of video on said remote computer together with selected audio from the first stream of video or the second stream of video.

11. The method according to claim 10, wherein the remote computer includes the step of selectively transmitting an audio component from said first stream of entertainment video or said second stream of video to audio speakers located proximate to the remote computer.

12. The method according to claim 10,
    a) wherein the remote computer further includes the steps of,
       1) receiving at least two streams of video from a broadcast computer via said distributed network of computers, and,
       2) transmitting an operator generated indicia to said broadcast computer via said distributed network of computers; and,
    b) wherein said broadcast computer further includes the steps of, in response to said operator generated indicia, transmitting a third stream of video in lieu of the second stream of video.

* * * * *